(12) United States Patent
Dhawan et al.

(10) Patent No.: US 7,904,835 B1
(45) Date of Patent: Mar. 8, 2011

(54) SYNCHRONIZING KEYBOARD CURSOR AND MOUSE CURSOR MOVEMENTS

(75) Inventors: Anmol Dhawan, Ghaziabad (IN); Sachin Soni, New Delhi (IN); Sachin Gaur, Ghaziabad (IN); Ganesh Sahai, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 577 days.

(21) Appl. No.: 11/744,830

(22) Filed: May 5, 2007

(51) Int. Cl.
*G06F 3/00* (2006.01)

(52) U.S. Cl. .......................................... 715/858; 715/756

(58) Field of Classification Search .................. 715/858, 715/856
See application file for complete search history.

(56) References Cited

U.S. PATENT DOCUMENTS

| | | | |
|---|---|---|---|
| 4,190,835 A | 2/1980 | Buynak | |
| 4,760,386 A | 7/1988 | Heath et al. | |
| 5,596,347 A | 1/1997 | Robertson et al. | |
| 5,905,497 A * | 5/1999 | Vaughan et al. | 345/672 |
| 6,014,140 A | 1/2000 | Strand | |
| 6,489,981 B1 * | 12/2002 | Jones | 715/862 |
| 6,781,571 B2 * | 8/2004 | Bates et al. | 345/159 |
| 2005/0179655 A1 | 8/2005 | Ludwig | |
| 2006/0143571 A1 | 6/2006 | Chan | |

* cited by examiner

*Primary Examiner* — Dennis Bonshock
(74) *Attorney, Agent, or Firm* — Robert C. Kowert; Meyertons, Hood, Kivlin, Kowert & Goetzel, P.C.

(57) ABSTRACT

A system and method for moving a mouse cursor along with the keyboard cursor on a display. The method extracts a location of the keyboard cursor on a display, and locates the mouse cursor into the location of keyboard cursor automatically. The method of an embodiment of the invention saves the mouse dragging time on the display while performing a mouse operation at the location of the keyboard cursor.

3 Claims, 5 Drawing Sheets

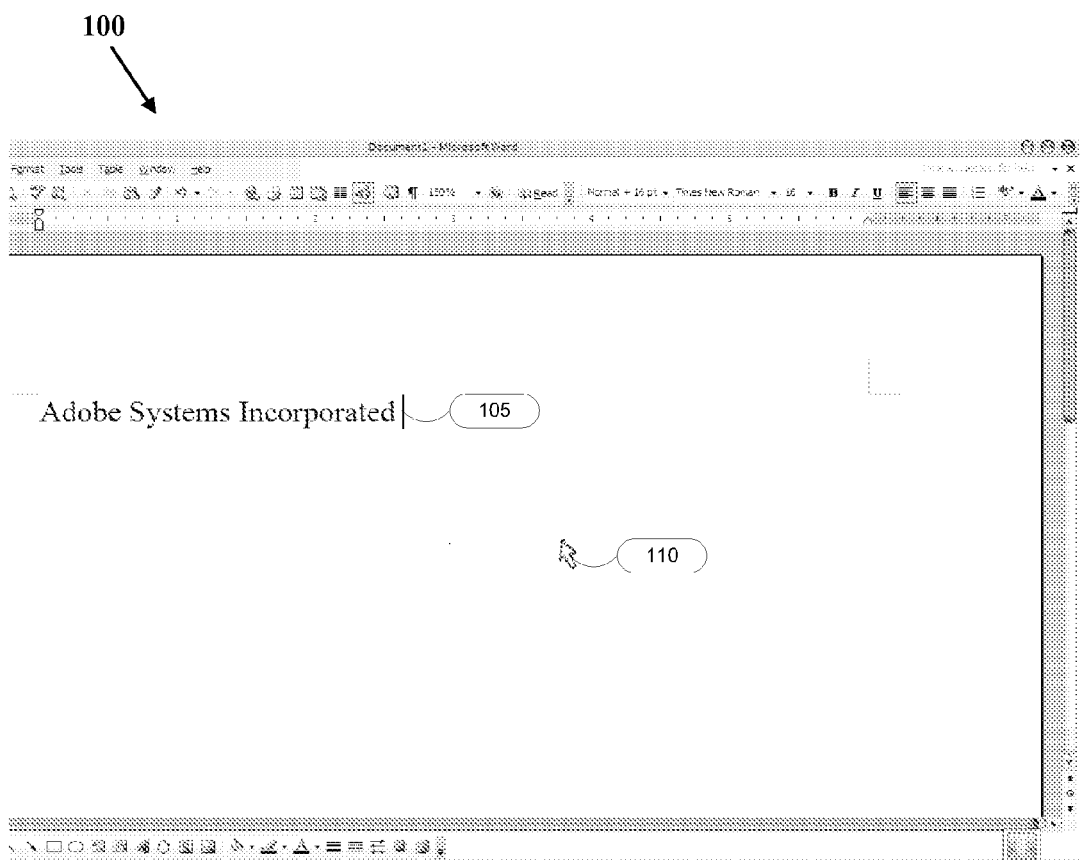
FIG: 1 (Prior Art)

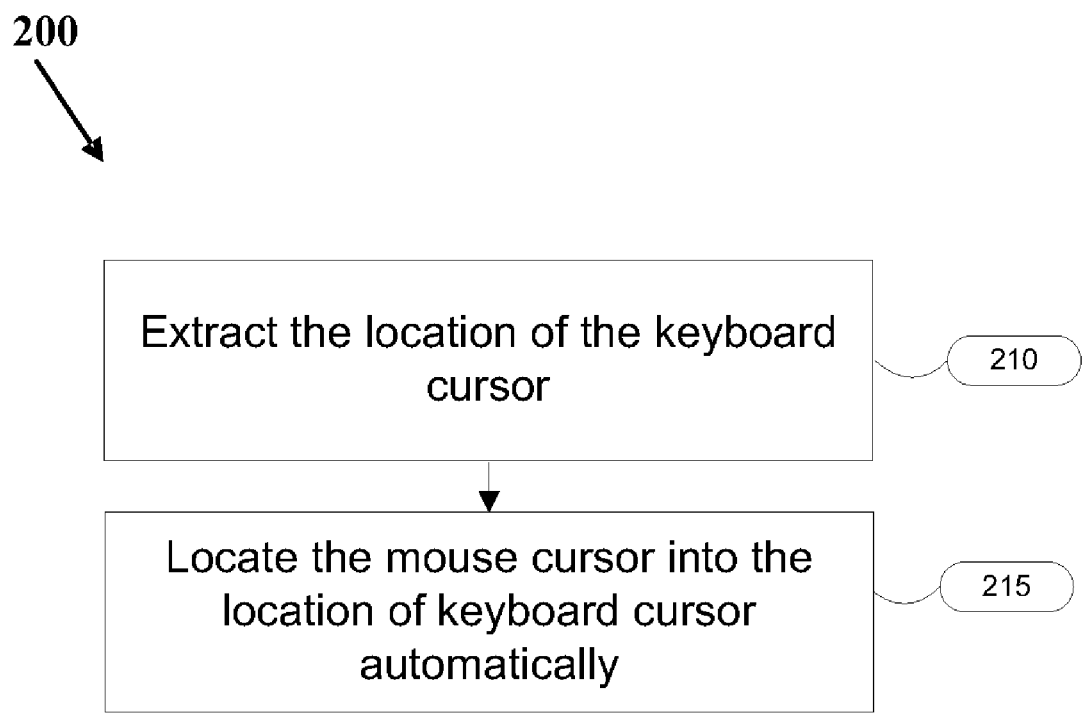
FIG: 2

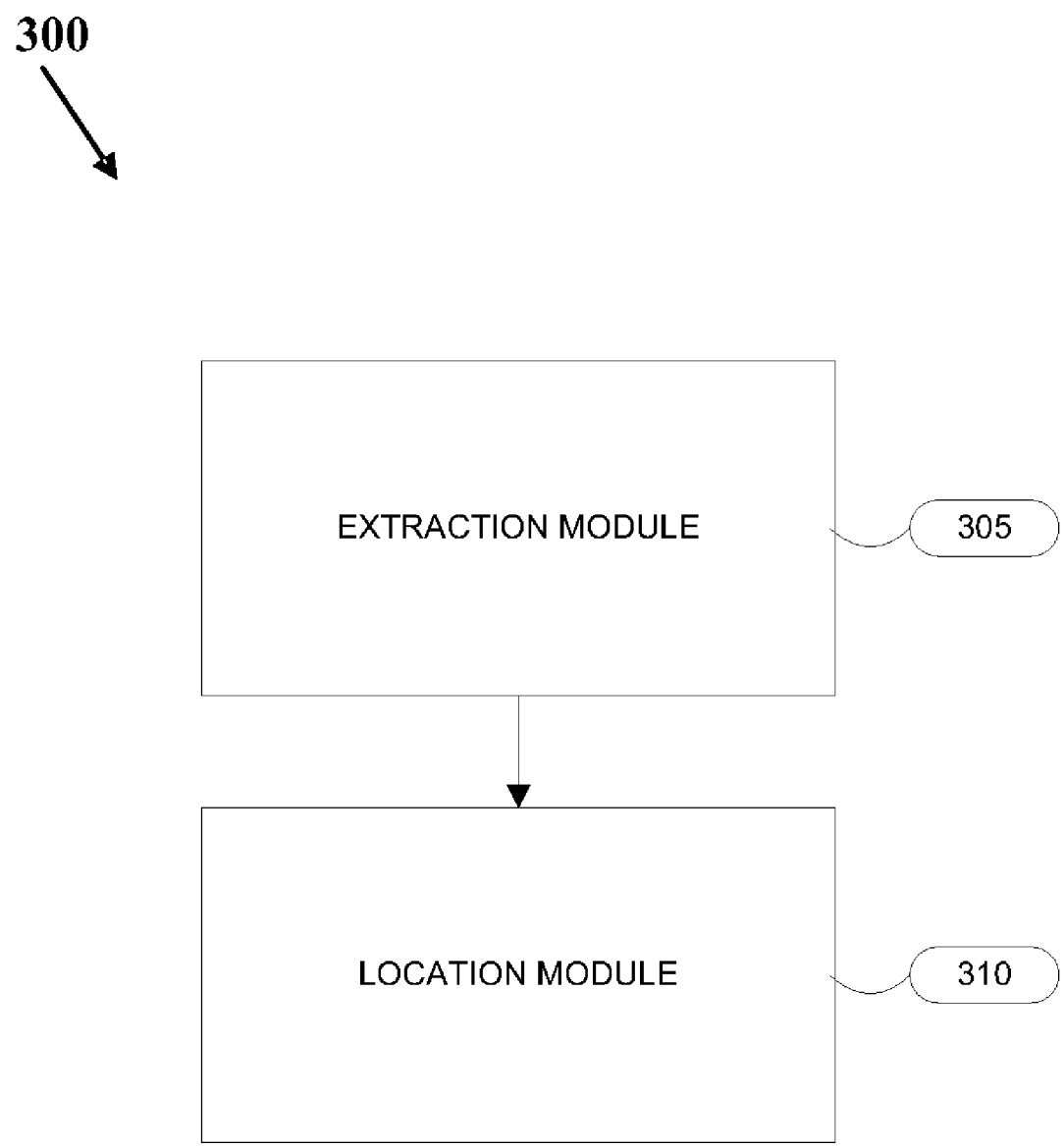
FIG: 3

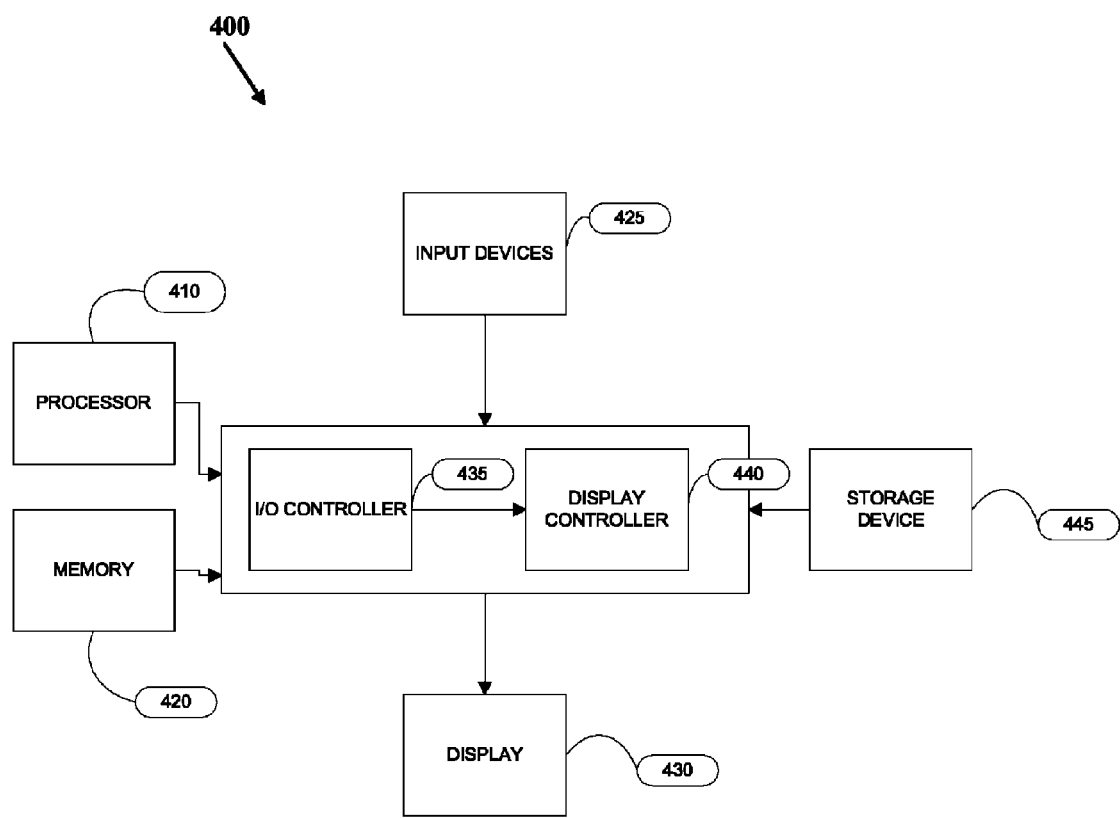
FIG: 4

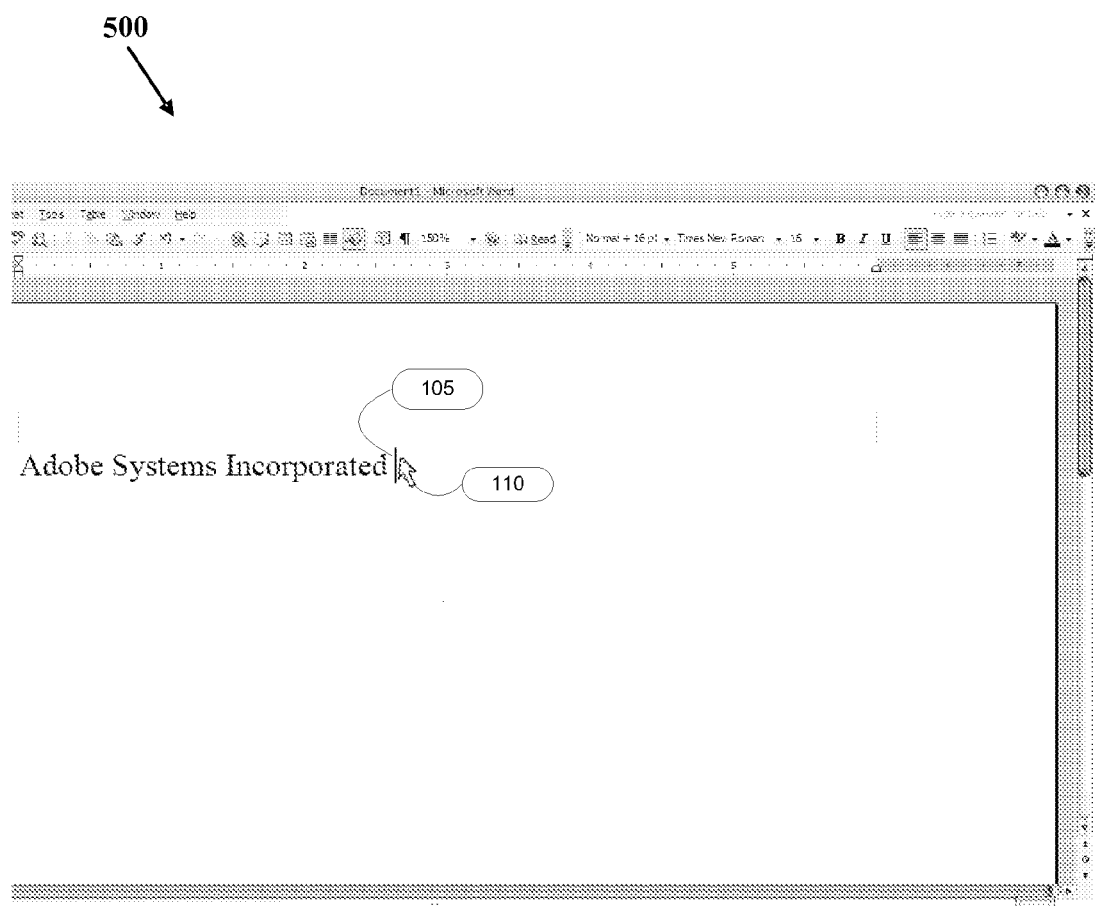
FIG: 5

SYNCHRONIZING KEYBOARD CURSOR AND MOUSE CURSOR MOVEMENTS

TECHNICAL FIELD

Embodiments of the invention relate generally to computer displays, and more particularly to synchronizing keyboard cursor and mouse cursor movements.

BACKGROUND

A graphical user interface (GUI) for a computer system provides a graphical representation or display on a display device associated with the computer system. This graphical representation allows a user to interact with one or more programs loaded on the computer system through input devices such as keyboard cursors, mouse cursors and cursor control devices such as mouse and monitor such actions. When using a GUI to interact with a program or computer system, cursors allow the user to move to various positions on the display which comprises the GUI and perform different functions such as typing, editing and so on. Typically, in word processing systems, the keyboard cursor moves along with the text on the display as the user types the text and the mouse cursor remains stationary.

Problems arise when a user, for instance, desires to correct a spelling mistake. Typically, the user will need to right click on the word by dragging the mouse cursor to the word. This is time consuming not to mention tedious when editing bulk text.

Further, if a user hovers a mouse pointer over various fields in a form based PDF document without clicking on it, tooltips associated with the various fields appear. A tooltip refers to a supplemental text that appears when a user hovers a mouse pointer over an area of the text without clicking on it. However, tooltips do not appear if the user clicks on a tab key because clicking on the tab key does not cause the mouse to move. In such a case, the user will need to physically hover the mouse pointer over desired areas for tooltips to appear. Such a method is cumbersome.

FIG. 1 illustrates the respective positions of a keyboard cursor 105 and mouse cursor 110 on a display in a word processing program according to the prior art 100. When user is typing a text, the keyboard cursor 105 moves along with the text whereas the mouse cursor 110 remains stationary. In instances where the user desires to edit some typed text, the user needs to drag the mouse cursor 110 to the keyboard cursor 105 location for performing this action. For example, if the user makes a spelling mistake while typing a text, he/she has to drag the mouse cursor 110 to that particular word (where the keyboard cursor 105 is located) to correct the word. This is a tedious and time consuming process which reduces computing speed.

In some other prior art techniques, the mouse cursor 110 is controlled by the keyboard cursor 105. However, the above-defined problems persist with these techniques as well because these methods do not align the keyboard cursor 105 movement with the mouse cursor movement 110. Thus, each time a user desires to drag the mouse cursor 110 he/she needs to hit a key on the keyboard.

SUMMARY

Embodiments of the invention described herein provide a computer implemented method, system and computer program product for automatically moving a mouse cursor along with the keyboard cursor on a display. Embodiments of the invention save the mouse dragging time on the display while performing a mouse operation at the location of the keyboard cursor.

An example method of an embodiment of the invention provides moving the mouse cursor along with the keyboard cursor on a display automatically. The method extracts a location of the keyboard cursor on the display, and locates the mouse cursor into the location of keyboard cursor automatically.

An example system of an embodiment of the invention provides moving the mouse cursor along with the keyboard cursor on a display automatically. The system includes an extraction module for extracting the location of the keyboard cursor on the display; and a location module for locating the mouse cursor into the location of keyboard cursor automatically.

An example computer program product, encoded on a computer-readable medium, operable to cause data processing apparatus to perform operations to provide moving the mouse cursor along with the keyboard cursor on a display automatically. The computer program extracts the location of the keyboard cursor; and locates the mouse cursor into the location of keyboard cursor automatically.

Other embodiments of the invention may be used in products such as Adobe® InCopy, InDesign® and FrameMaker®. This summary is not intended to describe each embodiment of the invention. The following Detailed Description and Figures provide additional aspects of embodiments of the invention.

BRIEF DESCRIPTION OF THE DRAWINGS

FIG. 1 is a view of the keyboard cursor and mouse cursor on a display according to prior art;

FIG. 2 is a flow chart illustrating the sequence of steps in the method for automatically moving mouse cursor along with the keyboard cursor on a display according to an embodiment of the invention;

FIG. 3 is a block diagram view of an embodiment of the invention;

FIG. 4 illustrates an embodiment of a computing system environment; and

FIG. 5 is a view of the keyboard cursor and mouse cursor on a display according to an embodiment of the invention.

DETAILED DESCRIPTION OF EMBODIMENTS

FIG. 1 is a screen shot 100 illustrating the keyboard cursor 105 and mouse cursor 110 on a display according to prior art.

FIG. 2 is a flow chart illustrating the sequence of steps in the method 200 for automatically moving mouse cursor along with the keyboard cursor on a display according to an embodiment of the invention. The method starts when a user input is received which moves the keyboard cursor on the display. Step 205 extracts the location of the keyboard cursor on the display. Various extraction algorithms known in the art can be used to extract the location of the keyboard cursor. After extracting the location of the keyboard cursor, step 210 automatically locates the mouse cursor into the location of the keyboard cursor.

Step 210 of extracting the location of the keyboard cursor on the display can be performed, for example, using a 'get function' (For example, Get ( ) API). An example location extraction code is given as follows:

```
public: static
property Point Position
{Point get ( );
void set (Point value);
}
```

Get ( ) function extracts the current keyboard cursor position (location). After extracting the current location of the keyboard cursor, for example, a set function can be used to place the mouse cursor in the current keyboard cursor position. This can be performed using, for example, set_pos([x, y]) API.

In one embodiment of the invention, whenever a keyboard cursor movement is detected on the display, the mouse cursor will be located to the location of the keyboard cursor using the aforementioned method 200. It will be appreciated that the mouse cursor can be separately moved in response to a user input which instructs to move the keyboard cursor and mouse cursor separately, without being synchronized.

The method 200 of an embodiment of the invention can be performed in response to a user input which specifies to move the mouse cursor along with the keyboard cursor. Alternatively, the method 200 of an embodiment of the invention can be integrated into word processing software.

FIG. 3 is a block diagram view of an embodiment of the invention 300. Extraction module 305 performs step 205 of extracting the location of the keyboard cursor on the display. Location module 310 performs step 210 of automatically locating the mouse cursor into the location of the keyboard cursor.

The method of one embodiment of the invention is preferably performed by a computing system 400 as shown in FIG. 4. The computing system 400 includes a processor 410, memory 420 (e.g. Random Access Memory (RAM)), a storage device 445 (e.g. CD ROM) coupled to the processor 410 through an input output (I/O) controller 435. A display controller 440 controls the generation of display on a display device 430. I/O controller 435 provides user input through input devices 425. Input devices 425 include a keyboard, mouse, joystick, trackball, track pad, track stick and the like. The display 430 displays an interface with a cursor (keyboard cursor, mouse cursor and the cursors of other input devices) when the cursor is controlled by an input device 425.

Through execution of executable instructions stored in the memory 420 or storage device 445, computing system 400 automatically performs the method 200 of FIG. 2. Additionally, the method 200 can be performed as program instructions. It will be appreciated that the exemplary embodiment of the mouse cursor is provided by way of illustration and not a limitation. Other pointing devices including trackball, touch pad, touch stick or devices where a two dimensional controlled motion of user's hand or fingers is translated to a similar motion on the display can be used and are encompassed by the embodiments of the invention.

FIG. 5 is a screen shot 500 illustrating the keyboard cursor 105 and mouse cursor 110 on a display according to an embodiment of the invention. In this embodiment of the invention, the mouse cursor 110 is moved along with the keyboard cursor 105.

Embodiments of the invention are explained using the following example. User types 'Adobe Systems Incorporated' in a word processing system and makes a spelling mistake for the word 'systems' and desires to correct it. In conventional method, as shown in FIG. 1, user has to drag the mouse cursor, which is located somewhere on the display, to the word 'systems' and right click the mouse to correct it. According to an embodiment of the invention, when user mistypes the word, the mouse cursor 110 will be moving along with the keyboard cursor 105 as shown in FIG. 5. User simply right clicks on the word and corrects it. The mouse cursor 110 does not have to be dragged to the word, instead right clicking the mouse will provide user the option menu for correcting the word.

Embodiments of the invention can be used in word processing systems where the mouse cursor 510 needs to be dragged to the location of keyboard cursor 505.

The forgoing description sets forth numerous specific details to convey a thorough understanding of the invention. However, it will be apparent to one skilled in the art that the embodiments of the invention may be practiced without these specific details. Some well-known features are not described in detail in order to avoid obscuring the invention. Other variations and embodiments are possible in light of above teachings, and it is thus intended that the scope of invention not be limited by this Detailed Description, but only by the following Claims.

We claim:

1. A computer implemented method, comprising:
    extracting a location of a keyboard cursor on a display, wherein the keyboard cursor visibly moves as a plurality of text characters are visibly entered and visibly displayed in response to keyboard input; and
    locating a mouse cursor to said location of said keyboard cursor so that the mouse cursor automatically moves together with the keyboard cursor as the plurality of text characters are entered in response to the keyboard input.

2. A system, comprising:
    a processor; and
    a memory storing program instructions executable by the processor to implement:
        an extraction module for extracting a location of a keyboard cursor on a display, wherein the keyboard cursor visibly moves as a plurality of text characters are visibly entered and visibly displayed in response to keyboard input; and
        a location module for locating a mouse cursor to said location of said keyboard cursor so that the mouse cursor automatically moves together with the keyboard cursor as the plurality of text characters are entered in response to the keyboard input.

3. A storage device storing program instructions operable to cause a programmable processor to implement:
    receiving input indicating that movement of a keyboard cursor and a mouse cursor should be synchronized;
    extracting a location of the keyboard cursor on a display, wherein the keyboard cursor visibly moves as a plurality of text characters are visibly entered and visibly displayed in response to keyboard input;
    locating the mouse cursor to said location of said keyboard cursor so that the mouse cursor automatically moves together with the keyboard cursor as the plurality of text characters are entered in response to the keyboard input; and
    receiving another input indicating that the keyboard cursor and the mouse cursor should move separately on the display so that the mouse cursor does not automatically synchronize with the keyboard cursor.

* * * * *